US011200798B2

(12) United States Patent
Tokunaga et al.

(10) Patent No.: US 11,200,798 B2
(45) Date of Patent: *Dec. 14, 2021

(54) GROUPING OF MOVING OBJECTS

(71) Applicant: INTERNATIONAL BUSINESS MACHINES CORPORATION, Armonk, NY (US)

(72) Inventors: Asuka Tokunaga, Tokyo (JP); Satoshi Hosokawa, Kodaira (JP); Shoichiro Watanabe, Tokyo (JP); Yasutaka Nishimura, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 186 days.

This patent is subject to a terminal disclaimer.

(21) Appl. No.: 16/780,997

(22) Filed: Feb. 4, 2020

(65) Prior Publication Data

US 2020/0175856 A1  Jun. 4, 2020

Related U.S. Application Data

(63) Continuation of application No. 15/990,923, filed on May 29, 2018, now Pat. No. 10,614,707.

(51) Int. Cl.
*G08G 1/01* (2006.01)
*H04W 4/46* (2018.01)

(52) U.S. Cl.
CPC ......... *G08G 1/0141* (2013.01); *G08G 1/0112* (2013.01); *G08G 1/0125* (2013.01); *H04W 4/46* (2018.02)

(58) Field of Classification Search
CPC .. G08G 1/0141; G08G 1/0112; G08G 1/0125; H04W 4/46; H04W 4/029; H04W 4/08; H04W 4/40
See application file for complete search history.

(56) References Cited

U.S. PATENT DOCUMENTS 7,714,536 B1    5/2010  Silberg
2011/0288754 A1*  11/2011  Shida ................. G08G 1/22
                                              701/117

(Continued)

FOREIGN PATENT DOCUMENTS

WO    2014204885 A1   12/2014
WO    2016143113 A1    9/2016

OTHER PUBLICATIONS

Sago et al., "On Data Dissemination for Information Sharing Based on Inter-Vehicle Communication", Jul. 13, 2006, 6 Pages, vol. II, 21st International Conference on Advanced Information Networking and Applications Workshops (AINAW'07), IEEE Computer Society, Niagara Falls, Ontario, Canada.

(Continued)

*Primary Examiner* — Yuen Wong
(74) *Attorney, Agent, or Firm* — Rakesh Roy

(57) ABSTRACT

The present invention may be a method, a computer system, and a computer program product for grouping a plurality moving objects capable of communicating with a server computer. The server computer performs the method comprising: predicting travel routes of the plurality of moving objects, using current traveling data and travel history data; grouping the plurality of moving objects into at least one group, using the predicted travel routes; determining a representative moving object in each group; and communicating with the representative moving object.

20 Claims, 13 Drawing Sheets

(56) References Cited

U.S. PATENT DOCUMENTS

| | | |
|---|---|---|
| 2014/0159923 A1 | 6/2014 | Koodli |
| 2016/0054736 A1 | 2/2016 | Kolhouse |
| 2016/0277513 A1 | 9/2016 | Kim |
| 2019/0371165 A1 | 12/2019 | Tokunaga |

OTHER PUBLICATIONS

IBM: List of IBM Patents or Patent Applications Treated as Related (Appendix P), Feb. 4, 2020, 2 pages.

\* cited by examiner

GROUPING OF MOVING OBJECTS

BACKGROUND

The present invention relates generally to the management of moving objects, and more particularly to the grouping of plural moving objects. Vehicles rapidly become "connected vehicles" that access, consume, and create information and share it with drivers, passengers, public infrastructure, and machines including other vehicles.

A connected vehicle solution relating to the connected vehicles is a technology based on a wireless communication. The connected vehicle solution aims to provide safe, interoperable wireless network communications using vehicle to vehicle (V2V or V to V), vehicle to infrastructure (V2I) or Vehicle to everything (V2X). The vehicles can communicate through a device equipped with an on-board vehicle or a car navigation system, using the wireless network communication.

In the connected vehicle solution, sensor data is usually transmitted from a vehicle to a server, and then the server analyzes the sensor data to obtain, for example, real-time traffic information, up-to-date maps or weather information or to apply the analyzed data to various solutions. The existing connected vehicle solution assumes that the sensor data is periodically transmitted from each vehicle at a short interval (e.g., once per second). Accordingly, the server can obtain the current location of the vehicle based on the periodically received sensor data.

SUMMARY

Aspects of the present invention are directed to a method, computer system, and computer program product for grouping plural moving objects capable of communicating with a server computer.

According to an aspect of the present invention, a computer-implemented method for grouping plural moving objects. The plural moving objects are capable of communicating with a server computer. The present invention may include predicting travel routes of a plural moving objects, using current traveling data and travel history data. The present invention may also include grouping the plural moving objects into at least one group, using the predicted travel routes. The present invention may then include determining a representative moving object in each group. The present invention may further include communicating with the representative moving object.

According to an aspect of the present invention, a computer system is provided. The computer system may include one or more computer processors, and a memory storing a program which, when executed on the processor, performs an operation for performing the method disclosed herein.

According to an aspect of the present invention, a computer program product is provided. The computer program product may comprise a computer readable storage medium having program instructions embodied therewith. The program instructions are executable by a computer to cause the computer to perform the method disclosed herein.

BRIEF DESCRIPTION OF THE SEVERAL VIEWS OF THE DRAWINGS

The disclosure will provide details in the following description of preferred embodiments with reference to the following figures. The figures are not necessarily to scale. The figures are merely schematic representations, not intended to portray specific parameters of the invention. The figures are intended to depict only typical embodiments of the invention. In the figures, like numbering represents like elements.

DETAILED DESCRIPTION

Figure 1A:
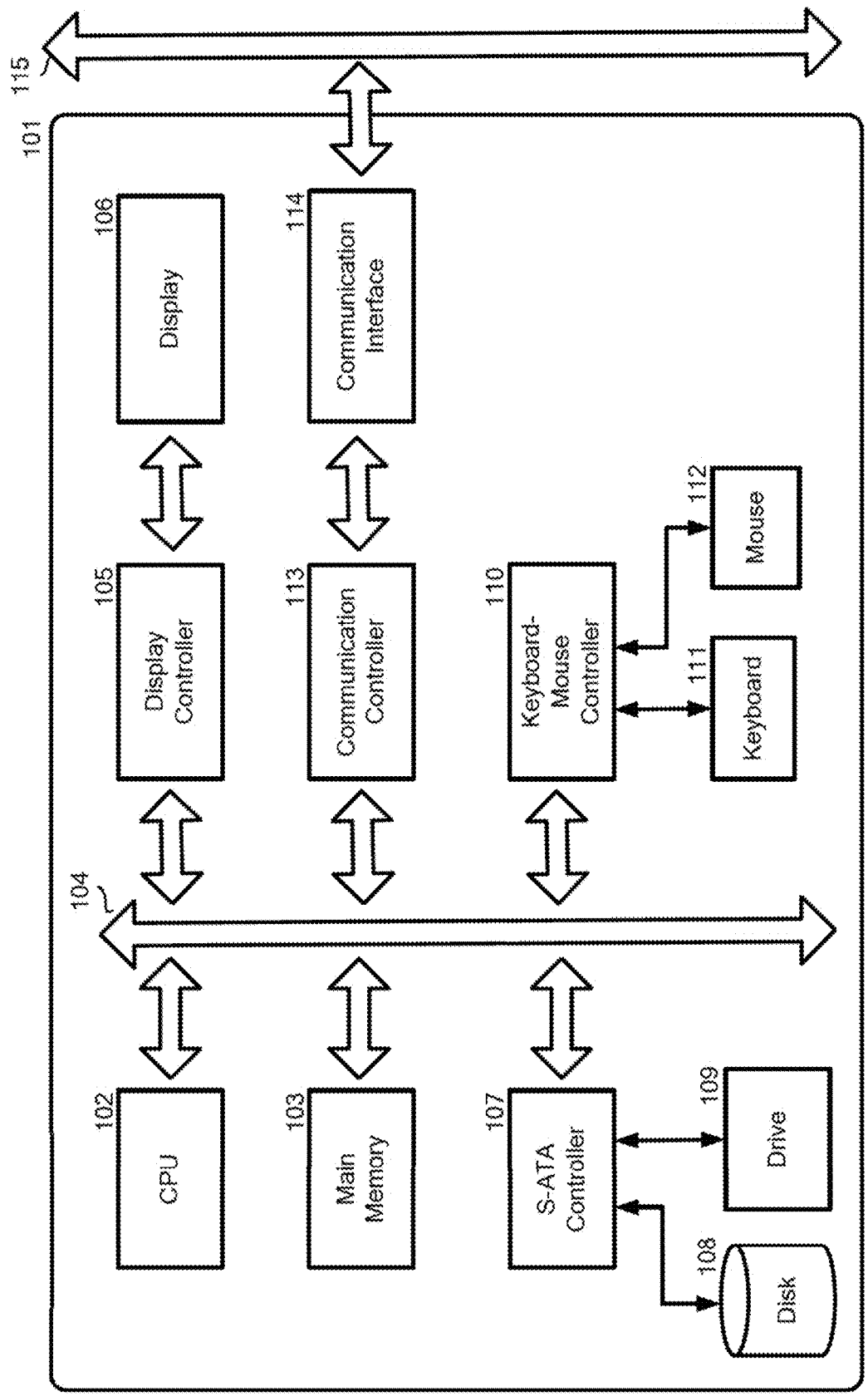
FIG. 1A is an exemplified block diagram depicting a server computer used in accordance with an embodiment of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by those of skill in the art, an embodiment of the present invention may be embodied as a method, a computer system, or a computer program product. Accordingly, an embodiment of the present invention may take the form of an entirely hardware-based embodiment, an entirely software-based embodiment, including, for example, firmware, resident software ad micro-code, and the like, or may take the form of an embodiment combining software-based and hardware-based aspects, which may be collectively referred to herein as a "circuit," a "module," or a "system".

As used herein, the expression "a/one" should be understood as "at least one." The expression "include(s)/including a/one" should be understood as "include(s)/including at least one." The expression "include(s)/including" should be understood as "include(s)/including at least." The expression "/" should be understood as "and/or."

To define more clearly terms as used herein, exemplified definitions of the terms are provided hereinafter, this should be interpreted broadly as known to a person skilled in the art or a technical field to which the present invention pertains.

As used herein, the term "a moving object" may refer to any vehicles including, for example, any number of wheeled vehicles, such as four or more wheeled vehicles, including cars, trucks, buses, and other four wheeled vehicles; two-wheeled vehicles, including motorcycles, bicycles, and other two wheeled vehicles.

The moving object are capable of communicating with a server computer through, for example, any device equipped with on-board moving object such as on-board vehicle, any navigation system such as a car navigation system, any device associated with a driver of a moving object, for example, devices equipped with a global positioning system (GPS) function, for example, a GPS receiver, a tablet, a smartphone or a pocket WiFi (e.g., Pocket WiFi® (Pocket WiFi and all Pocket WiFi-based trademarks and logos are trademarks or registered trademarks of eMobile Ltd. Corporation and/or its affiliates)). Any communication method known in the art can be used for communicating between the moving object and the server computer.

The moving object may be also capable of communicating with another or other vehicles, using V2V and/or an infrastructure using V2I.

The moving object may further include a GPS unit or any appropriate location device for obtain information on position or geolocation of the moving object itself. The appropriate location devices may be, for example, an electronic compass, triangulation device, radar, sonar, or a combination thereof.

The moving object may transmit current traveling data to the server computer. The current traveling data may include, for example, the speed of a moving object, information on driving location and/or driving direction, state parameters of the automotive traveling process, or real-time, mileage and other status information. For example, the current traveling data may be "car probe data".

Figure 1B:
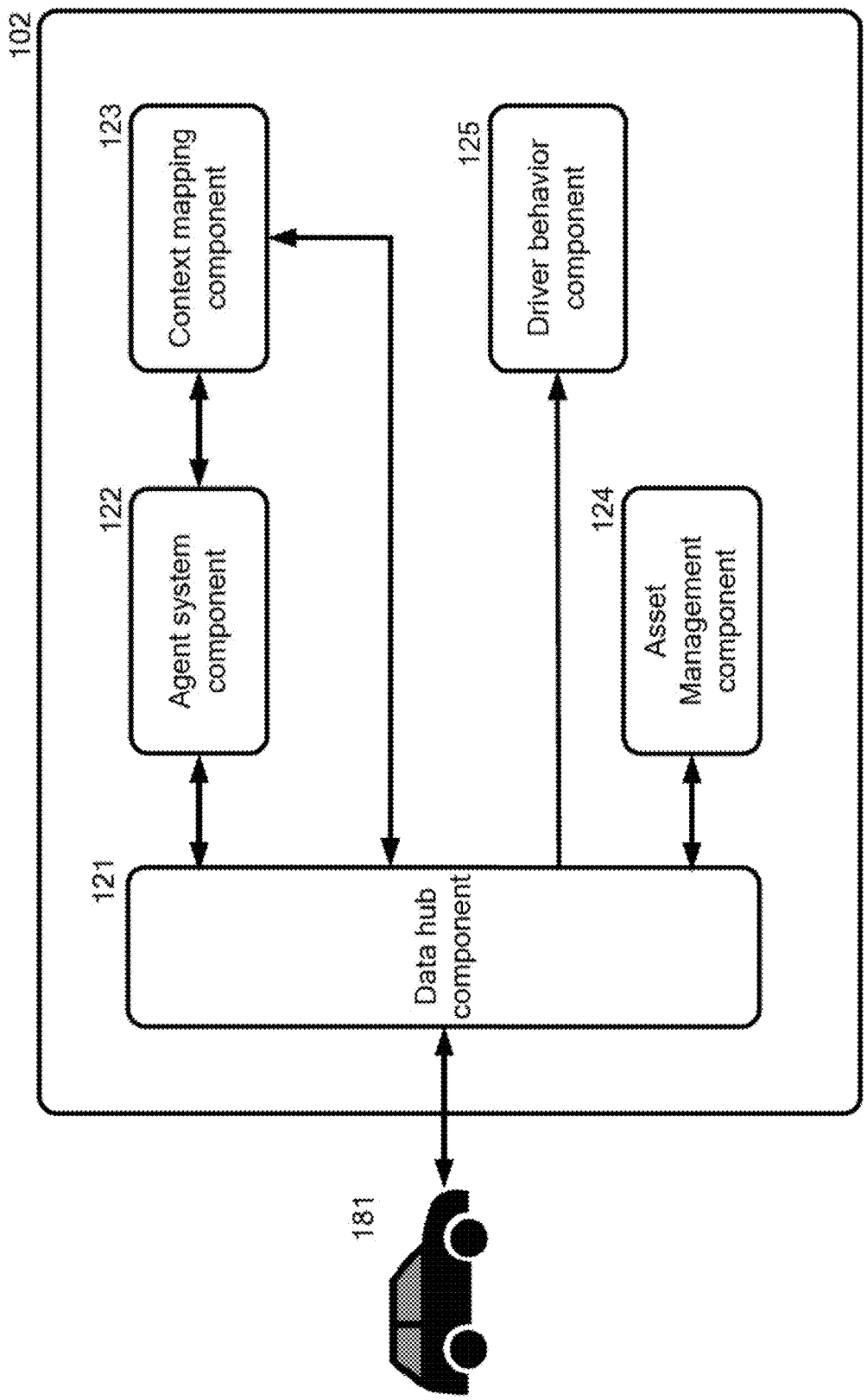
FIG. 1B is an exemplified system architecture of the server computer used in accordance with an embodiment of the present invention.

FIGS. 1A and 1B illustrate a server computer used in accordance with an embodiment of the present invention. With reference now to FIG. 1A, FIG. 1A is an exemplified block diagram depicting a server computer used in accordance with an embodiment of the present invention. Hereinafter, the term "a server computer" may be also simply referred to as "a server".

A server (101) may be, for example, but is not limited to, a workstation, a rack-mount type server, a blade type server, a mainframe server, or a cloud server and may run, for example, a hypervisor for creating and running one or more virtual machines. The server (101) may include one or more CPUs (102) and a main memory (103) connected to a bus (104). The CPU (102) may be preferably based on a 32-bit or 64-bit architecture. The CPU (102) may be, for example, but is not limited to, the Power® series of International Business Machines Corporation; the Core i™ series, the Core 2™ series, the Atom™ series, the Xeon™ series, the Pentium® series, or the Celeron® series of Intel Corporation; or the Phenom™ series, the Athlon™ series, the Turion™ series, or Sempron™ of Advanced Micro Devices, Inc. ("Power" is registered trademark of International Business Machines Corporation in the United States, other countries, or both; "Core i", "Core 2", "Atom", and "Xeon" are trademarks, and "Pentium" and "Celeron" are registered trademarks of Intel Corporation in the United States, other countries, or both; "Phenom", "Athlon", "Turion", and "Sempron" are trademarks of Advanced Micro Devices, Inc. in the United States, other countries, or both).

A display (106) such as a liquid crystal display (LCD) may be connected to the bus (104) via a display controller (105). The display (106) may be used to display, for management of the computer(s), information on a computer connected to a network via a communication line and information on software running on the computer using an appropriate graphics interface. The display may have a touch screen or a non-touch screen. The display may be, for example, a LCD, PDP, OEL or a projection type display. A disk (108) such as a hard disk or a solid state drive, SSD, and a drive (109) such as a CD, a DVD, or a BD (Blu-ray disk) drive may be connected to the bus (104) via an SATA or IDE controller (107). Moreover, a keyboard (111) and a mouse (112) may be connected to the bus (104) via a keyboard-mouse controller (110) or USB bus (not shown).

An operating system, programs providing Windows®, UNIX® Mac OS®, Linux®, or a Java® processing environment, Java® applications, a Java® virtual machine (VM), and a Java® just-in-time (JIT) compiler, such as J2EE®, other programs, and any data may be stored in the disk (108) to be loadable to the main memory. ("Windows" is a registered trademark of Microsoft corporation in the United States, other countries, or both; "UNIX" is a registered trademark of the Open Group in the United States, other countries, or both; "Mac OS" is a registered trademark of Apple Inc. in the United States, other countries, or both; "Linux" is a registered trademark of Linus Torvalds in the United States, other countries, or both; and "Java" and "J2EE" are registered trademarks of Oracle America, Inc. in the United States, other countries, or both).

The drive (109) may be used to install a program, such as the computer program of an embodiment of the present invention, readable from a CD-ROM, a DVD-ROM, or a BD to the disk (108) or to load any data readable from a CD-ROM, a DVD-ROM, or a BD into the main memory (103) or the disk (108), if necessary.

A communication interface (114) may be based on, for example, but is not limited to, the Ethernet® protocol. The communication interface (114) may be connected to the bus (104) via a communication controller (113), physically connects the server (101) to a communication line (115), and may provide a network interface layer to the TCP/IP communication protocol of a communication function of the operating system of the server (101). In this case, the communication line (115) may be a wired LAN environment or a wireless LAN environment based on wireless LAN connectivity standards, for example, but is not limited to, IEEE® 802.11a/b/g/n ("IEEE" is a registered trademark of Institute of Electrical and Electronics Engineers, Inc. in the United States, other countries, or both).

The server (101) can receive current traveling data transmitted from moving objects.

With reference now to FIG. 1B, FIG. 1B is an exemplified system architecture of the server used in accordance with an embodiment of the present invention.

The server (102) corresponds to the server (101) described in FIG. 1A. The server (102) may be a foundational real-time infrastructure platform that provides features to support emerging autonomous driving capabilities.

The server (102) may include a data hub component (121), an agent system component (122), a context mapping component (123), an asset management component (124) and a driver behavior component (125).

The data hub component (121) may be a front-end component that collects and manages large volumes of moving object data from connected moving objects and automotive devices by using a range of protocols and formats. When the data hub component (121) receives data from the moving objects, the data is normalized, integrated with asset information, and then dispatched to other components such as the context mapping component (123) and the river behavior component (125), both internal and external.

The agent system component (122) may detect, store, and manage events that are related to moving objects, driving activity, and movement. The agent system component (122) manages moving objects which are now driving as an agent. The agent system component (122) is integrated with the mapping system. Events are determined by predefined and customized rules that are created in the system. The agent system component (122) sends and receives data from other components of internet of things (IoT) for Automotive.

The context mapping component (123) may provide geospatial functions, including map matching, road geometry data retrieval, shortest path search for global road networks, and real-time traffic event manipulation. The map matching is used for matching the raw GPS location coordinates from a moving object to the coordinates of the actual mapped road network. The road geometry data retrieval is used for retrieving the mapped road network to draw road shapes on a map. The shortest path search for global road networks is used for searching for the shortest route that incorporates real-time events such as traffic delays and incidents. The real-time traffic event manipulation is used for adding real-time map-matched events, such as traffic conditions, to improve route planning results.

The asset management component (124) may provide asset management capabilities for managing moving objects, drivers, and the relationships between them. Assets define the different moving object data types that are related to moving object devices that you want to connect to the system. Assets also define the environmental data about drivers, map sources, geographical areas, analytic rules, events, and other things that are meaningful to the connected car ecosystem.

The driver behavior component (125) may analyze driver behavior data from a connected moving object or automotive device together with geospatial contextual data. By using the API service, the analyzed driver data can be integrated with automotive applications to gain valuable insights into driving behavior and moving object usage patterns. The driver behavior component (125) may also provide a service for analyzing the geographical movement of moving objects and route patterns of journeys. A trajectory pattern of the journey is generated and analyzed to provide insights into movement of a moving object.

Hereinafter, the various embodiments of the present invention will be described with reference to the following FIG. 2, FIG. 3, FIGS. 4A to 4C, FIGS. 5A to 5D, FIG. 6, and FIG. 7.

The idea of an embodiment of the present invention is based on the following perceptions. As stated above, the existing connected vehicle solution assumes that the sensor data is periodically transmitted from each vehicle at a short interval. However, some applications, such as applications for displaying summarized data (e.g., traffic volume) may not always require exact location information on all vehicles. Further, available communication capacity assigned to each vehicle may be limited to a predetermined megabyte (MB) per year. In this case, reducing the total communication volume may be given priority rather than obtaining exact location information on all vehicles.

Accordingly, there may be a need that a communication frequency between a vehicle and a server is properly controlled in accordance with application use cases for a connected vehicle solution.

Figure 2:
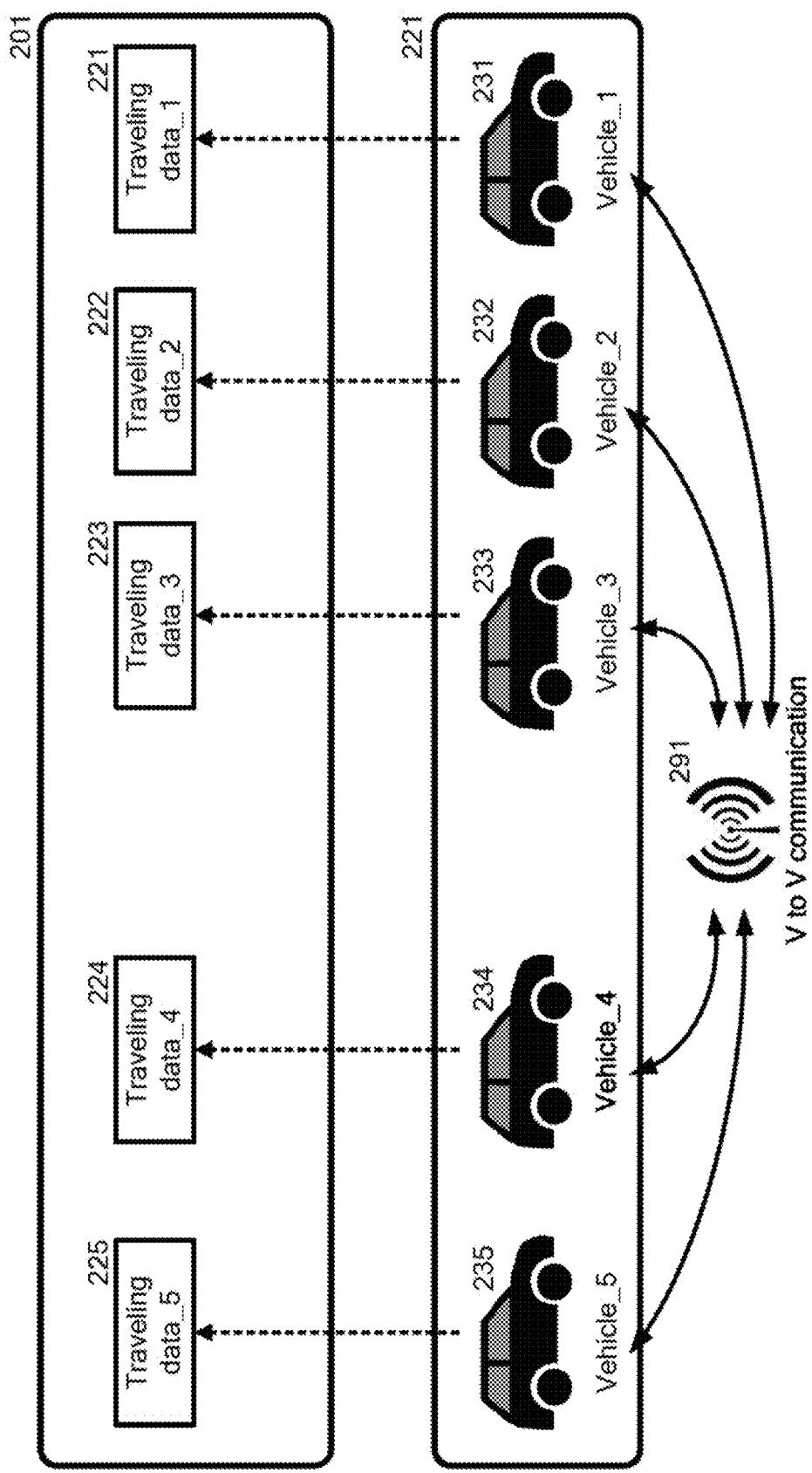
FIG. 2 is a block diagram depicting a method for transmitting traveling data from each of moving objects as a group to a server computer.

With reference now to FIG. 2, FIG. 2 is a block diagram depicting a method for transmitting traveling data from each of the vehicles as a group to a server. FIG. 2 illustrates a server (201) corresponding to the server (101) described in FIG. 1.

An example may include that plural moving objects (e.g., Vehicles_1 to 5 (231, 232, 233, 234 and 235) are now traveling on the same road and direction. Vehicles_1 to 5 (231, 232, 233, 234 and 235) can communicate with the server (201). Vehicles_1 to 5 (231, 232, 233, 234 and 235) can also communicate with each other using V to V communication (291) in order to transmit or exchange information.

Each of Vehicles_1 to 5 (231, 232, 233, 234 and 235) transmits current traveling data_1 to 5 (221, 222, 223, 224 and 225) to the server (201), respectively. The server (201) receives the current traveling data_1 to 5 (221, 222, 223, 224 and 225) from each of Vehicles_1 to 5 (231, 232, 233, 234 and 235) through a network (not shown).

The server (201) predicts a travel route of Vehicle_1 (231), using the current traveling data_1 (221) and travel history data associated with Vehicle_1 (231). The same applies also to each of Vehicles_2 to 5 (232, 233, 234 and 235). The server (201) then makes a group (221) consisting of Vehicles_1 to 5 (231, 232, 233, 234 and 235) while referring to the predicted travel routes of Vehicles_1 to 5 (231, 232, 233, 234 and 235). The server (201) continuously receives current traveling data_1 to 5 (221, 222, 223, 224 and 225) from each of Vehicles_1 to 5 (231, 232, 233, 234 and 235).

Accordingly, a communication line between each of Vehicles_1 to 5 (231, 232, 233, 234 and 235) and the server is always used as long as the current traveling data_1 to 5 (221, 222, 223, 224 and 225) is transmitted from each of Vehicles_1 to 5 (231, 232, 233, 234 and 235).

Figure 3:
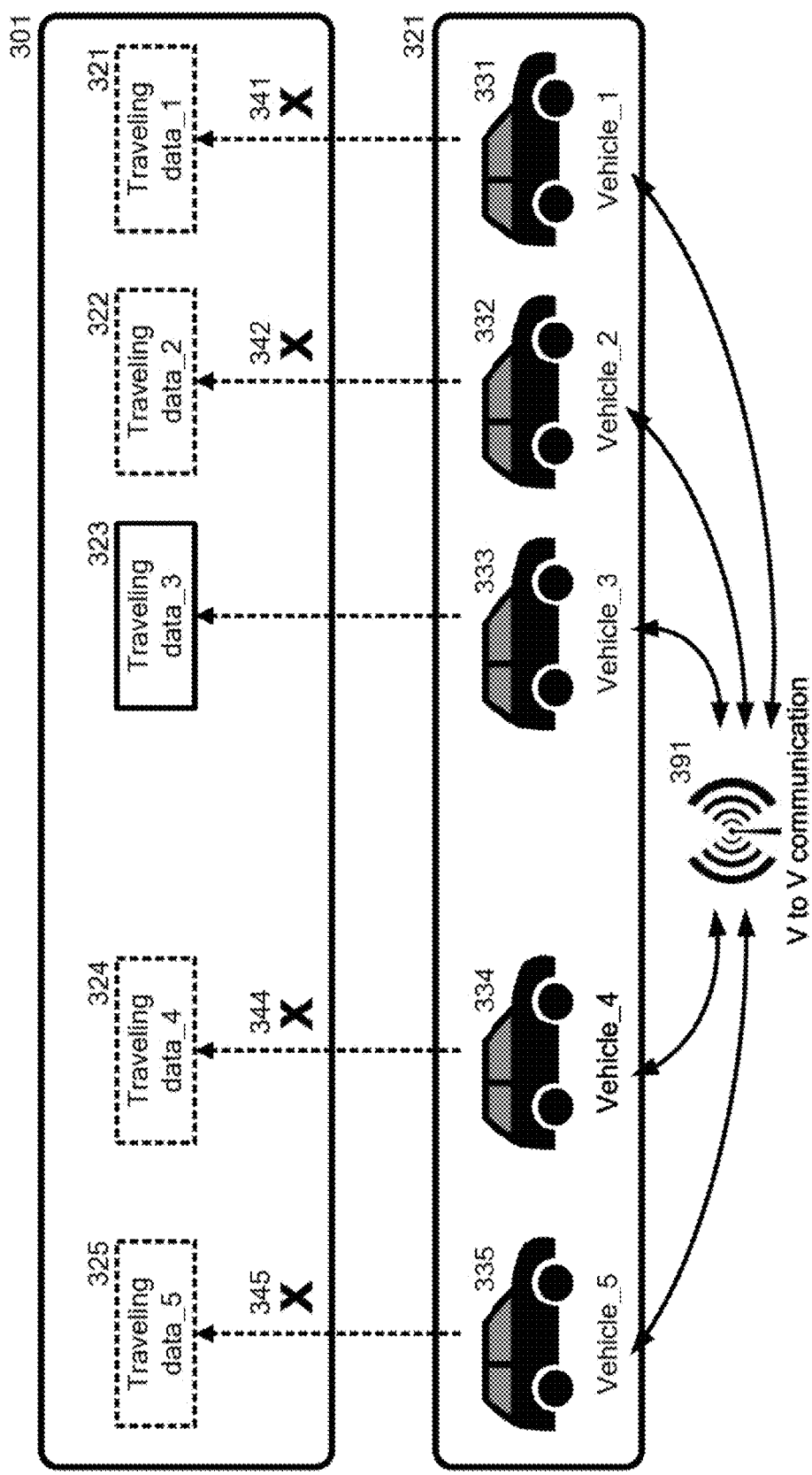
FIG. 3 is a block diagram depicting a method for transmitting traveling data from a representative of moving object as a group to a server computer, in accordance with an embodiment of the present invention.

With reference now to FIG. 3, FIG. 3 is a block diagram depicting a method for transmitting traveling data from a representative of vehicles as a group to a server, in accordance with an embodiment of the present invention.

The server (301) corresponds to the server (201) described in FIG. 2. Vehicles_1 to 5 (331, 332, 333, 334 and 335) correspond to Vehicles_1 to 5 (231, 232, 233, 234 and 235) described in FIG. 2, respectively. The server (301) makes a group (321) consisting of Vehicles_1 to 5 (331, 332, 333, 334 and 335), using the same manner as described in FIG. 2.

After making the group, the server (301) determines a representative vehicle among Vehicles_1 to 5 (331, 332, 333, 334 and 335) as the group (321). Let us suppose that Vehicle_3 (333) is determined as the representative vehicle in the group (321). The server (301) manages Vehicle_3 (333) as the representative vehicle in the group (321) and, therefore, the remaining Vehicles_1, 2, 3 and 4 (331, 332, 334 and 335) are regarded as the non-representative moving objects in the group (321) (hereinafter also referred to as "non-representative Vehicles_1, 2, 4 and 5 (331, 332, 334 and 335)").

For example, the server may have the following information on the group (321): "Group ID: 1, Number of Vehicles: 5, Representative: Vehicle_3, and Predicted destination: . . . ".

In response to the determination of the representative vehicle, the server (301) may only communicate with the representative vehicle (e.g., Vehicle_3 (333)) without communicating with the non-representative Vehicles_1, 2, 4 and 5 (331, 332, 334 and 335).

Accordingly, total communication volume between the group (321) and the server (301) can be reduced using only the communication line between the representative Vehicle_3 (333) and the server (301), compared to the embodiment described in FIG. 2.

The information from the server (301) can be shared among the group (321) using the representative Vehicle_3 (333) through V to V communication (391) between the representative Vehicle_3 (333) and each of the non-representative Vehicles_1, 2, 4 and 5 (331, 332, 334 and 335).

For example, the information from the server (301) may have the following information on the group (321): "Group ID: 1, Current speed as statics: 68.2 km/h, Current heading: 100, and Current lane number: 1." Group ID may denote the group identification (GID) number which may be assigned by the server (301). Current speed as statics denotes, for example, an average speed of moving objects in the group. Current heading may denote a direction of moving objects in the group, for example, the north is set to zero and values are given in a clockwise manner in the group. Current lane number may denote the number of lanes on which moving objects in the group are now running.

Further, the server (301) may generate traveling data on the non-representative Vehicles_1, 2, 4 and 5 (331, 332, 334 and 335) while referring to current traveling data on the representative Vehicle_3 (333), without receiving the current traveling data on each of the non-representative Vehicles_1, 2, 4 and 5 (331, 332, 334 and 335).

Accordingly, the server (301) can know the predicted current location of each of the non-representative Vehicles_1, 2, 4 and 5 (331, 332, 334 and 335) with a certain degree of accuracy while reducing the total communication volume between the group (321) and the server (301). Further, the server (301) then predicts traveling of the group (321) using the current traveling data on the representative Vehicle_3 (333), the generated traveling data on the non-representative Vehicles_1, 2, 4 and 5 (331, 332, 334 and 335) and context information as explained below.

The context information may include, for example, route search information, road attributes information, driving characteristics information, weather information, traffic information, or a combination thereof. The route search information may include, for example, information on a destination or transit point. The route search information may be obtained by a navigation system, for example a car navigation system, equipped with a moving object, or by a navigation application installed on devices associated with a driver of a moving object such as a GPS receiver, a tablet, a smartphone or a pocket WiFi®.

The road attributes information may include, for example, surface type, lanes such as the number of lanes, parking lane, sidewalk, traffic signs, trees, street lamps and parking areas. The driving characteristics information may include, for example, vehicle speed, space headway, operation of brake or accelerator pedals, reaction time, and braking time. The traffic information may include, for example, a traffic congestion, an accident, a road regulation, or a combination thereof. The traffic information may be live or real-time traffic information, statistics traffic information or historical traffic information. The weather information may include, for example, up-to-date weather data, weather forecast, or a combination thereof. The weather information may be live or real-time weather information, statistics weather information or historical weather information.

Accordingly, the server (301) can obtain the predicted traveling of the group (321). The traveling of the group (321) may enable a traffic control, a detection of traffic congestion, measures to relieve traffic congestion and/or an automatic driving.

Figure 4A:
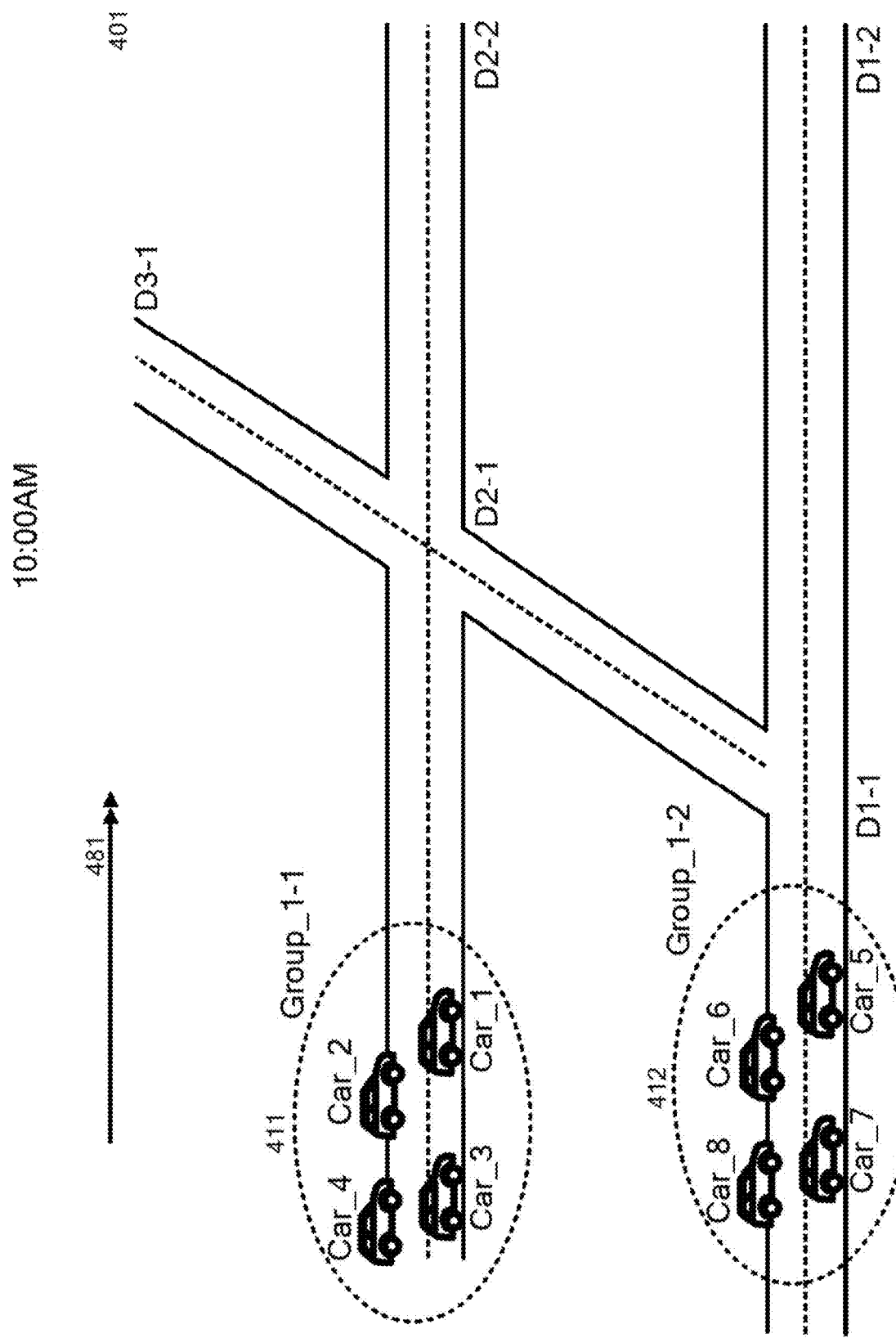
FIGS. 4A to 4C are a block diagram depicting a method of grouping the plural moving objects into at least one group, integrating the plural groups into one group, and splitting the group into plural groups, in accordance with an embodiment of the present invention.
Figure 4B:
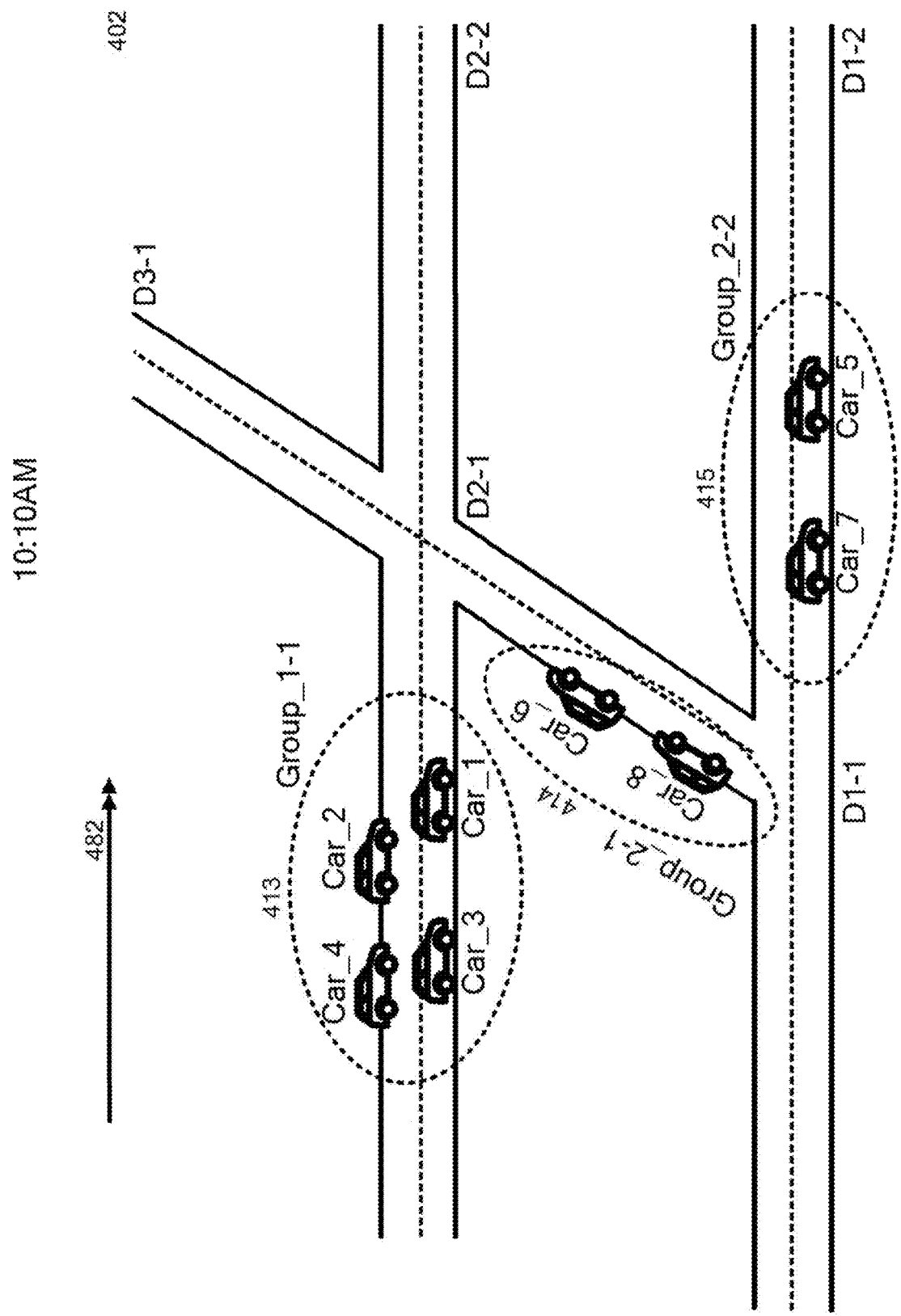
Figure 4C:
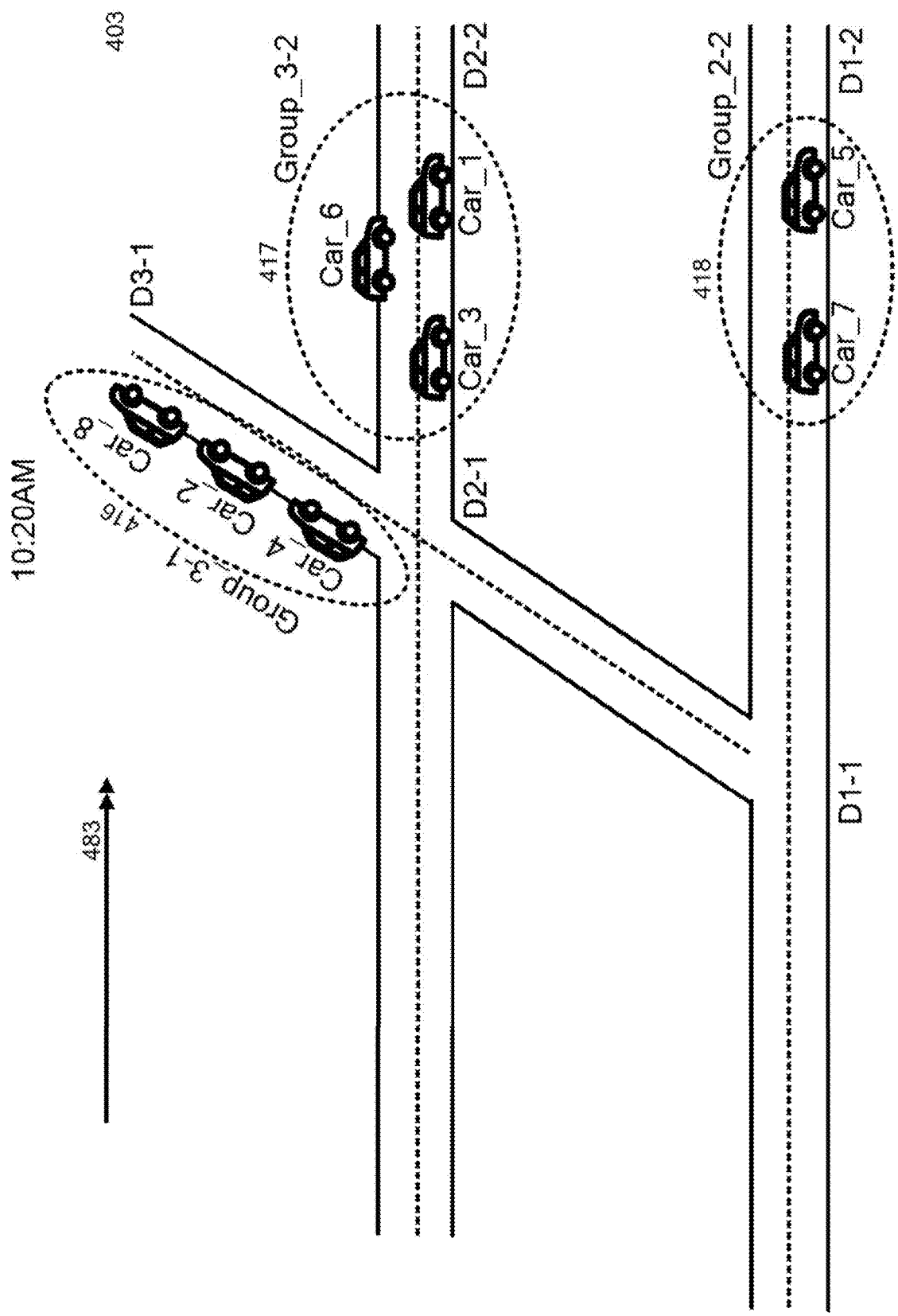

FIGS. 4A to 4C are block diagrams depicting a method of grouping the plural moving objects into at least one group, integrating the plural groups into one group, and splitting the group into plural groups, in accordance with an embodiment of the present invention. FIGS. 4A to 4C show plural groups consisting of plural cars, and that the split of a group and the integration of groups occur with the passage of time.

In FIGS. 4A to 4B, the opposite lane has been omitted for ease of explanation. Further, the number of moving objects in each group is few for or ease of explanation, but actually more cars may be present in each group.

With reference now to FIG. 4A, FIG. 4A illustrates the case (401) there are two groups, Group_1-1 (411) and Group_1-2 (412), all of which were generated as each group in accordance with an embodiment of the block diagram described in FIG. 3. Let us suppose that the current time is 10:00 AM.

Car_1, Car_2, Car_3 and Car_4 are now traveling in the right direction (481) on the road (D2-2) and closely with each other. The server predicts travel routes of Car_1, Car_2, Car_3 and Car_4, using current traveling data on Car_1, Car_2, Car_3 and Car_4 and travel history data on Car_1, Car_2, Car_3 and Car_4 and then makes Group_1-1 (411) consisting of Car_1, Car_2, Car_3 and Car_4. The server determines Car_2 as a representative moving object in Group_1-1 (411) and, therefore, the remaining Car_1, Car_3 and Car_4 are regarded as the non-representative moving objects in Group_1-1 (411). Accordingly, only Car_2 in Group_1-1 (411) transmits current traveling data on Car_2 to the server. The server receives the current traveling data on Car_2 from Car_2 and communicates with Car_2 only in Group_1-1 (411). Car_5, Car_6, Car_7 and Car_8 are now traveling in the right direction (481) on the road (D1-2) and closely with each other. The server predicts travel routes of Car_5, Car_6, Car_7 and Car_8, using current traveling data on Car_5, Car_6, Car_7 and Car_8 and travel history data on Car_5, Car_6, Car_7 and Car_8 and then makes Group_1-2 (412) consisting of Car_5, Car_6, Car_7 and Car_8. The server determines Car_6 as a representative moving object in Group_1-2 (412) and, therefore, the remaining Car_5, Car_7 and Car_8 are regarded as the non-representative moving objects in Group_1-2 (412). Accordingly, only Car_6 in Group_1-2 (412) transmits current traveling data on Car_6 to the server. The server receives the current traveling data on Car_6 from Car_6 and communicates with Car_6 only in Group_1-2 (412).

Car_5, Car_6, Car_7 and Car_8 in Group_1-2 (412) are now approaching the intersection (D1-1). The server further predicts travel routes of Car_5, Car_7 and Car_8 in Group_1-2 (412), using current traveling data on Car_6 as the representative moving object in Group_1-2 (412), and one or more selected from the following: the generated traveling data on Car_6, Car_7 and Car_8 as the non-representative moving object in Group_1-2 (412), travel history data on Car_5, Car_6, Car_7 and Car_8, and context information as explained above. After the prediction, the server predicts a split of Group_1-2 (412) into plural groups using the further predicted travel routes. As illustrated in FIG. 4B, the server will split Group_1-2 (412) into two groups: Group_2-1 (414) and Group_2-2 (415), according to the predicted travel routes of each of Car_5, Car_6, Car_7 and Car_8.

With reference now to FIG. 4B, FIG. 4B illustrates the case (402) there are three groups, Group_1-1 (413), Group_2-1 (414) and Group_2-2 (415), all of which were generated as each group in accordance with an embodiment of the block diagram described in FIG. 3 and further illustrates that one group, Group_1-2 (412) described in FIG. 4A, was split into two groups, Group_2-1 (414) and Group_2-2 (415).

Let us suppose that the current time is 10:10 AM, which is ten minutes after the case (401) described in FIG. 4A.

Group_1-1 (413) corresponds to Group_1-1 (411) described in FIG. 4A. Only Car_2 in Group_1-1 (413) continues transmitting current traveling data on Car_2 to the server. The server receives the current traveling data on Car_2 from Car_2 and communicates with Car_2 only in Group_1-1 (411). Car_1, Car_2, Car_3 and Car_4 in Group_1-1 (413) are now approaching the intersection (D2-1) and closely with each other.

Group_2-1 (414) and Group_2-2 (415) correspond to Group_1-2 (412) before the split but were generated by splitting the Group_1-2 (412).

Group_2-1 (414) has Car_6 and Car_8. The server determines Car_6 as a representative moving object in Group_2-1 (414) and, therefore, Car_8 is regarded as the non-representative moving object in Group_2-1 (414). Accordingly, only Car_6 in Group_2-1 (414) transmits current traveling data on Car_6 to the server. The server receives the current traveling data on Car_6 from Car_6 and communicates with Car_6 only in Group_2-1 (414). Car_6 and Car_8 in Group_2-1 (414) are now approaching the intersection (D2-1) and closely with each other.

Group_2-2 (415) has Car_5 and Car_7. The server determines Car_5 as a representative moving object in Group_2-2 (415) and, therefore, Car_7 is regarded as the non-representative moving object in Group_2-2 (415). Accordingly, only Car_5 in Group_2-2 (415) transmits current traveling data on Car_5 to the server. The server receives the current traveling data on Car_5 from Car_5 and communicates with Car_5 only in Group_2-2 (415). Car_5 and Car_7 in Group_2-2 (415) are now traveling in the right direction (481) on the road (D1-2) and closely with each other.

As stated above, Car_1, Car_2, Car_3 and Car_4 in Group_1-1 (413) are now approaching the intersection (D2-1) closely with each other and further, Car_6 and Car_8 in Group_2-1 (414) are now approaching the intersection (D2-1) closely with each other.

The server further predicts travel routes of Car_1, Car_2, Car_3 and Car_4 in Group_1-1 (413), using current traveling data on Car_2 as the representative moving object in Group_1-1 (413), and one or more selected from the following: the generated traveling data on Car_1, Car_3 and Car_4 as the non-representative moving objects in Group_1-1 (413), travel history data on Car_1, Car_2, Car_3 and Car_4, and context information as explained above. Similarly, the server further predicts travel routes of Car_6 and Car_8 in Group_2-1 (414), using current traveling data on Car_6 as the representative moving object in Group_2-1 (414), and one or more selected from the following: the generated traveling data on Car_6 as the non-representative moving objects in Group_2-1 (414), travel history data on Car_6 and Car_8, and context information as explained above.

After the prediction, the server predicts a split of Group_1-1 (413) into plural groups using the further predicted travel routes. As illustrated in FIG. 4C, the server will split Group_1-2 (412) into two groups corresponding to Group_3-1 (416) and Group_3-2 (417), according to the predicted travel routes of each of Car_1, Car_2, Car_3 and Car_4. Similarly, the server predicts a split of Group_2-1 (413) into plural groups using the further predicted travel routes. As illustrated in FIG. 4C, the server will split Group_2-1 (413) into two groups corresponding to Group_3-1 (416) and Group_3-2 (417), according to the predicted travel routes of each of Car_6 and Car_8.

Further, the server predicts an integration of "Car_2 and Car_4" and "Car_8" into one group, using the aforesaid further predicted travel routes. As illustrated in FIG. 4C, the server will integrate the aforesaid "Car_2 and Car_4" and "Car_8" into Group_3-1 (416). Similarly, the server predicts an integration of "Car_1 and Car_3" and "Car_6" into one group, using the aforesaid further predicted travel routes. As illustrated in FIG. 4C, the server will integrate the aforesaid "Car_1 and Car_3" and "Car_6" into Group_3-2 (417).

With reference now to FIG. 4C, FIG. 4C illustrates the case (403) there are three groups, Group_3-1 (416), Group_3-2 (417) and Group_2-2 (418), all of which were generated as each group in accordance with an embodiment of the block diagram described in FIG. 3 and further illustrates that each of two groups, Group_1-1 (413) and Group_2-1 (414) described in FIG. 4B, were split into two groups and then further integrated into two groups, Group_3-1 (416) and Group_3-2 (417).

Let us suppose that the current time is 10:20 AM, which is ten minutes after the case (402) described in FIG. 4B. Group_3-1 (416) has Car_8, Car_2 and Car_4. The server determines Car_2 as a representative moving object in Group_3-1 (416) and, therefore, Car_8 and Car_4 are regarded as the non-representative moving objects in Group_3-1 (416). Accordingly, only Car_2 in Group_3-1 (416) transmits current traveling data on Car_2 to the server. The server receives the current traveling data on Car_2 from Car_2 and communicates with Car_2 only in Group_3-1 (416). Car_8, Car_2 and Car_4 in Group_3-1 (416) are now traveling on the road (D3-1) and closely with each other.

Group_3-2 (417) has Car_1, Car_6 and Car_3. The server determines Car_6 as a representative moving object in Group_3-2 (417) and, therefore, Car_1 and Car_3 are regarded as the non-representative moving objects in Group_3-2 (417). Accordingly, only Car_6 in Group_3-2 (417) transmits current traveling data on Car_6 to the server. The server receives the current traveling data on Car_6 from Car_6 and communicates with Car_6 only in Group_3-2 (417). Car_1, Car_6 and Car_3 in Group_3-2 (417) are now traveling in the right direction (481) on the road (D2-2) and closely with each other.

Group_2-2 (418) corresponds to Group_2-2 (415) described in FIG. 4B. Only Car_5 in Group_2-2 (415) continues transmitting current traveling data on Car_5 to the server.

The detailed steps of the grouping of moving objects and further the integration of groups and the split of a group will be explained below by referring to FIGS. 5A to 5D. FIGS. 5A to 5D are flowcharts depicting a method for grouping plural moving objects, in accordance with an embodiment of the present invention.

Figure 5A:
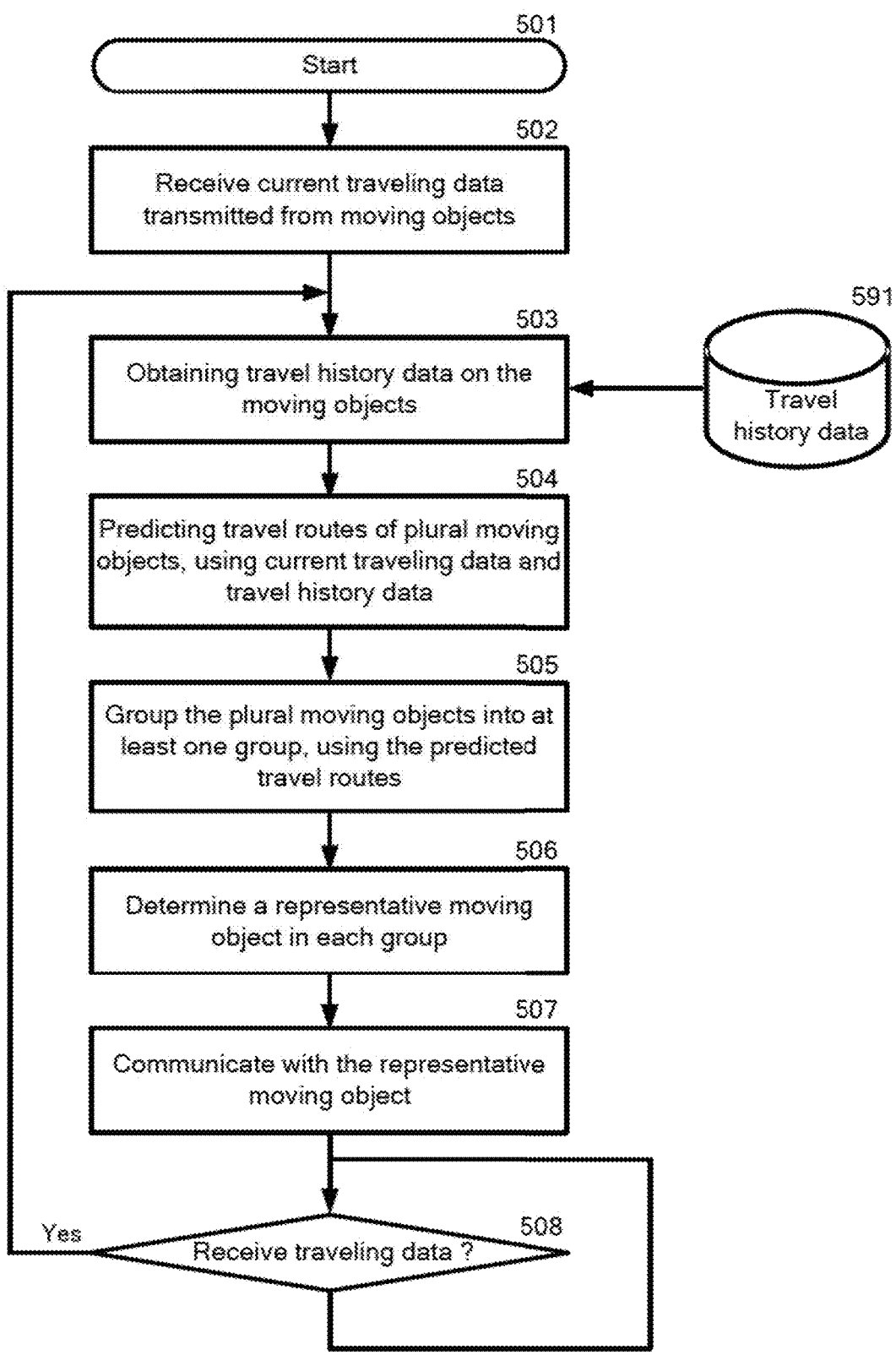
FIGS. 5A to 5D are flowcharts depicting a method for grouping plural moving objects, in accordance with an embodiment of the present invention.

With reference now to FIG. 5A, FIG. 5A illustrates a flowchart for a process of grouping plural moving objects and determining a representative moving object in each group to communicate with the representative moving object.

Let us suppose that moving objects transmit current traveling data to the server through a wireless network. The moving objects may obtain the current traveling data using a navigation system equipped with a moving object, a GPS unit equipped with a smartphone, a tablet or a cellular phone, or an engine control unit (ECU). The ECU may be any vehicle control system, for example, a braking control system, throttle control system, steering control system, or body control system. The ECU may include an advanced driver assistance system (ADAS) functions that automate, adapt, or enhance vehicle systems in order to increase vehicle safety and/or operator driving performance. For example, the ECU may include ADAS technologies that alert drivers to potential problems or to avoid collisions by implementing safeguards, such as autonomously controlling the vehicle. The ECU may also include ADAS features that enhance certain systems, such as automated lighting, automated parking, adaptive cruise control, automated braking, or improved blind spot elimination using camera technology. The ECU can also parse commands an action, such as an ADAS function in order to process the image data, the information on position and the any data obtained from another or other vehicles.

At step 501, the server starts the aforesaid process.

At step 502, the server receives current traveling data transmitted from moving objects, for example, each of the vehicles. For example, the current traveling data may be car probe data. The server may continue to receive current traveling data after step 501 as long as current traveling data is transmitted from moving objects.

At step 503, the server obtains, from a storage for storing travel history data (591), travel history data on the moving objects from which the current traveling data was now transmitted. The travel history data may include, for example, data related to travel history in each time zone, in each day, in weekday and weekend or in day of week; data generated using the Most Probable Path (MPP); weather, information on location such as GPS data; traveling pattern; traveling behavior; or a combination thereof.

This obtainment may be done by, for example, identifying an ID of the vehicle from the current traveling data and then choose travel history data associated with the identified ID from the storage (591).

At step 504, the server predicts travel routes of plural moving objects, using current traveling data obtained in step 502 and travel history data obtained in step 503. This prediction may be done by, for example, identifying moving objects which are predicted to travel on a common or similar rout using the current traveling data, such as driving location, driving direction, or a combination thereof and road map information.

At step 505, the server groups the plural moving objects into at least one group, using the predicted travel routes. The grouping result may be registered in the server by combining IDs of vehicles which may have been determined as the group and by associating the ID of the group and IDs of the vehicles as the group.

In one embodiment, the grouping may be done, for example, when the most recent moving routes of vehicles are the same or similar with each other. Then, the vehicles may be candidates to be grouped together since the driving properties (i.e., similar recent moving routes) of the vehicles are the same or similar with each other.

In another embodiment, the grouping may be done using context information as explained above. For example, when the route is congested or the own vehicle travels on a straight road not being able to change a lane (e.g., a mountain path), there is a high possibility that a vehicle(s) around the own vehicle travels near the own vehicle for some time.

In a further embodiment, the grouping may be done using information on a route search done by, for example, any navigation system such as a car navigation system or by a navigation application installed on a tablet or smartphone associated with a driver of a moving object, Most Probable Path (MPP), or a combination thereof. For example, when the route search was made and shows a common path, there is a high possibility that vehicles around the own vehicle travel near the own vehicle for some time. The Most Probable Path (MPP) will be briefly explained below by referring to FIG. 7.

Figure 7:
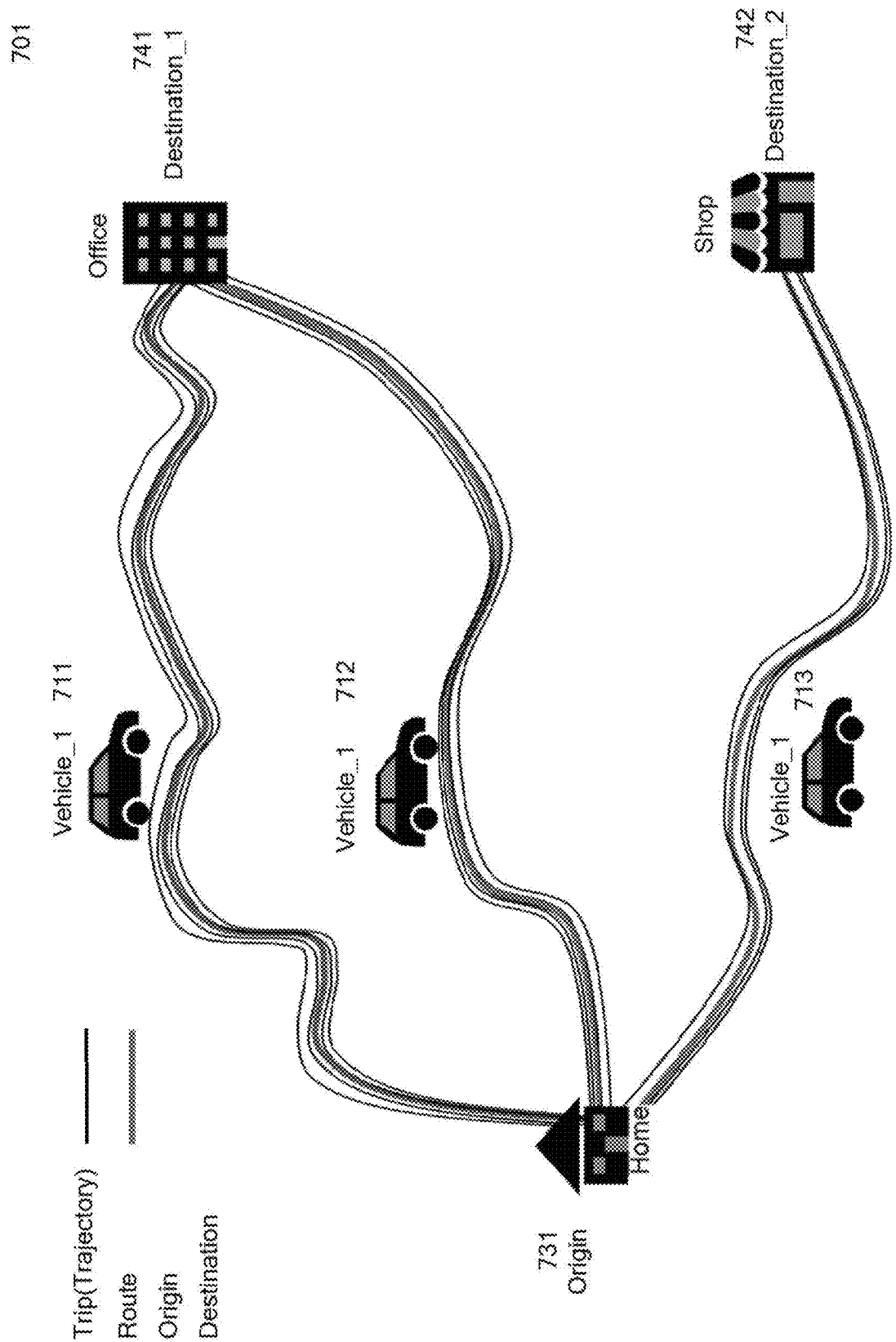
FIG. 7 is a block diagram depicting a method of most probable path prediction (MPP) which may be used in an embodiment of the present invention.

With reference now to FIG. 7, FIG. 7 is a block diagram depicting a method of most probable path prediction (MPP) (710) which may be used in an embodiment of the present invention. FIG. 7 illustrates the following three trajectory route patterns (e.g., route patterns that Vehicle_1 711, Vehicle_1 712 and Vehicle_1 713 are driving on). One route may be from an origin (731) to, for example, a home, a destination_1 (741) or an office. Another route may be from origin (731) to a destination_1 (741). One other route pattern may be from the origin (731) to an alternate destination_2 (742), such as a shop.

The server may choose one route among the aforesaid trajectory route patterns, based on, for example, a day, a time zone, weather, or a combination thereof, while referring to current traveling data.

With reference now back to FIG. 5A, at step 506, the server determines a representative moving object in each group. The determination may be done by, for example, identifying a vehicle which can act as a host vehicle; using the round-robin method which is known in the art, using context information as explained above, or specifying lead and/or tail moving objects in the group. For example, if a group is traveling near a link junction point, then both of the lead and tail moving objects in the group are specified and used for determining a representative moving object in the group. In other cases, the lead moving object in the group is specified and used for determining a representative moving object in the group.

The server may determine plural representative moving objects in one group for obtaining plural current traveling data from one group. This may enable the prediction of travel routes more precisely, but total communication volume between the group having plural representative moving objects and the server may increase compared to the total communication volume between the group having one representative moving object and the server.

At step 507, the server communicates with the representative moving object without communicating with another or other moving objects other than the representative moving object in a group (i.e., non-representative moving objects). Therefore, in one embodiment, the server may receive current traveling data only from the representative moving object. Further, the server may obtain information on the non-representative moving objects through the representative moving object.

In another embodiment, the server may transmit information only to the representative moving object. After the representative moving object receives the information from the server, the representative moving object may transmit the received information to the non-representative moving objects, using V2V, in order to share the information in the group. The information may include, for example, an event notification.

Accordingly, the total communication volume between the group and the server can be reduced using the communication between the representative moving object and the server. The server may or share the group information among a group through the representative moving object.

At step 508, the server judges whether traveling data is newly received or not. If the judgment is positive, the server proceeds back to step 503 in order to repeat steps 503 to 507. Meanwhile, if the judgment is negative, the server repeats step 508 until traveling data is newly received. The server may terminate the aforesaid process if an administrator of the server selects the termination of this process.

For the moving objects, a frequency of transmitting current traveling data from the moving object to the server varies depending on whether a moving object belongs to a group or not. If a moving object does not belong to a group, the moving object may transmit current traveling data to the server at a predetermined normal frequency.

Meanwhile, if a moving object belongs to a group after step 505 and 506, a frequency of transmitting current traveling data from the moving object to the server may vary depending on whether the moving object is a representative moving object or a non-representative moving object. If the moving object is a representative moving object, the representative moving object may transmit current traveling data to the server at a predetermined normal frequency.

If the moving object is a non-representative moving object, the non-representative moving object may not transmit current traveling data or may transmit current traveling data at the time when the following threshold exceeds the predetermined value, such as in a case where the traveling pattern of the non-representative moving object is largely deviated from that of the group. The large deviation of the traveling pattern may be considered an exceeded threshold of a predetermined value. In this case, it may be assumed that each non-representative moving object grasps a traveling speed and direction of the group using V to V communication. By transmitting the current traveling data when the threshold exceeds the predetermined value, the server may detect a speed change and a direction change of the non-representative moving object (i.e., may detect a separation from the group).

Figure 5B:
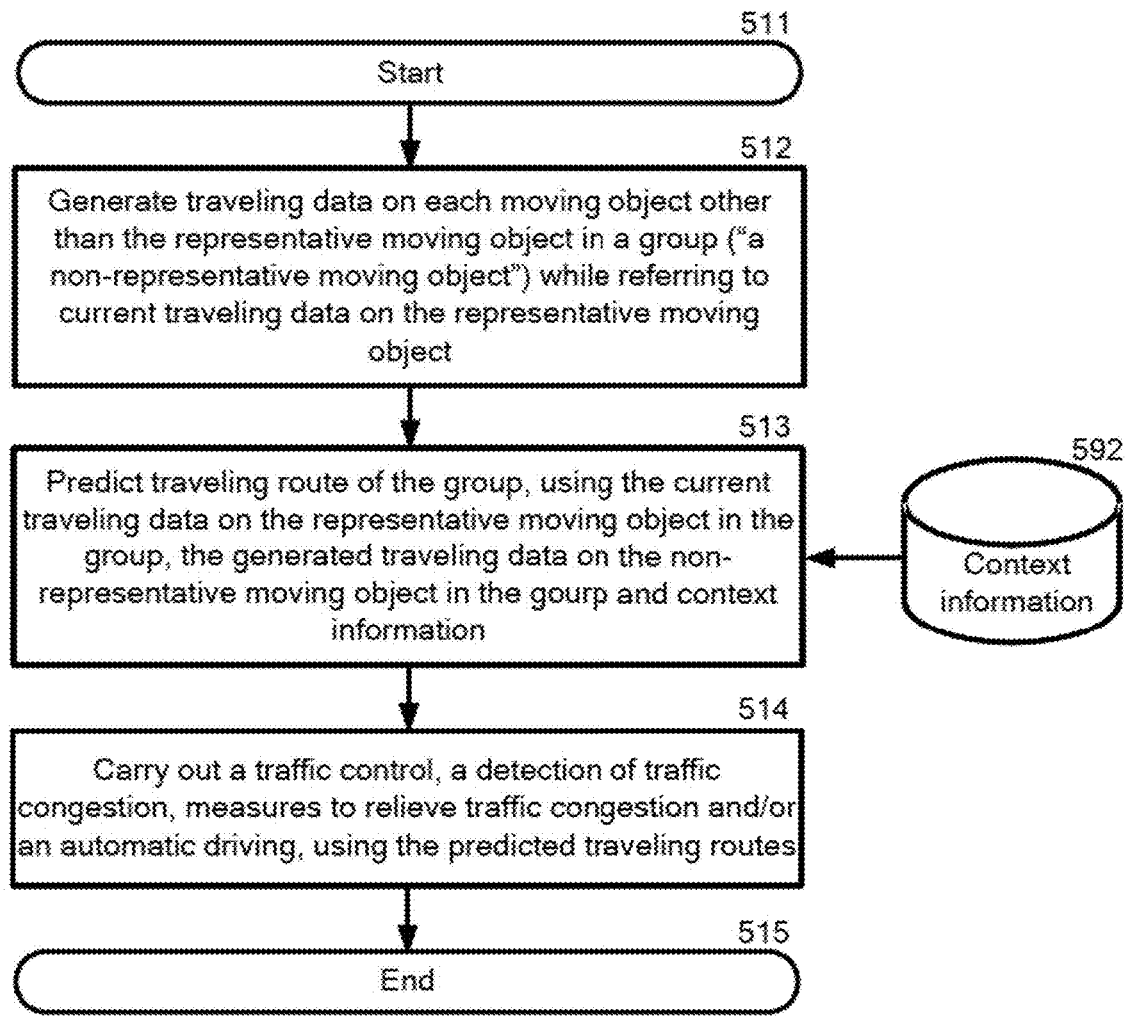

With reference now to FIG. 5B, FIG. 5B illustrates a flowchart for a process of generating traveling data after the grouping described in FIG. 5A and predicting traveling of the group.

At step 511, after the grouping, the server starts the aforesaid process. The server may continue to receive current traveling data transmitted from the representative moving object in each group and may repeat steps 503 to 508 described in FIG. 5A.

At step 512, the server generates traveling data on each moving object other than the representative moving object in a group (i.e. "a non-representative moving object") while referring to current traveling data on the representative moving object. The non-representative moving object may be one or more moving objects. For example, the traveling data on the non-representative moving object may be generated by presuming a length of the sequence of the moving objects in the group while referring to the presumed length. The length of the sequence of the moving objects in the group may be determined using model information on each of the moving objects. The traveling data generated may be car probe data or a part of car probe data.

Further according to this step, the server can predict the traveling data on the non-representative moving object. Accordingly, the server can know the predicted current location of the non-representative moving object with a certain degree of accuracy while reducing the total communication volume between the group and the server.

At step 513, the server predicts a traveling route of the group using the current traveling data on the representative moving object in the group, the generated traveling data on the non-representative moving object in the group, and context information as explained above. The server may obtain context information from a storage for storing context information (592).

According to this step, the server can predict the traveling route of the group, using the current traveling data on the representative moving object in the group, the generated traveling data on the non-representative moving object in the group and the aforesaid context information. As a result, the server can obtain the predicted traveling of the group. The traveling of the group may enable a traffic control, a detection of traffic congestion, measures to relieve traffic congestion and/or an automatic driving.

At step 514, the server may carry out a traffic control, a detection of traffic congestion and measures to relieve traffic congestion and/or an automatic driving using the predicted traveling route. The traffic control may include, for example, road traffic control, traffic signal control, changes of a maximum speed, increase or decrease of the number of entrances or exits of a highway or toll road, a change of the priority road, or a combination thereof. The traffic congestion may include, for example, any event which combines low vehicle speeds and long queues formed by these slow-moving vehicles. The measures to relieve traffic congestion may include, for example, road traffic control, traffic signal control, changes of a maximum speed, or a combination thereof. The automatic driving may include, for example, changes of a maximum speed of a vehicle.

Accordingly, an embodiment of the present invention enables moving objects to be managed as a group which are dynamically generated.

At step 515, the server terminates the aforesaid process.

Figure 5C:
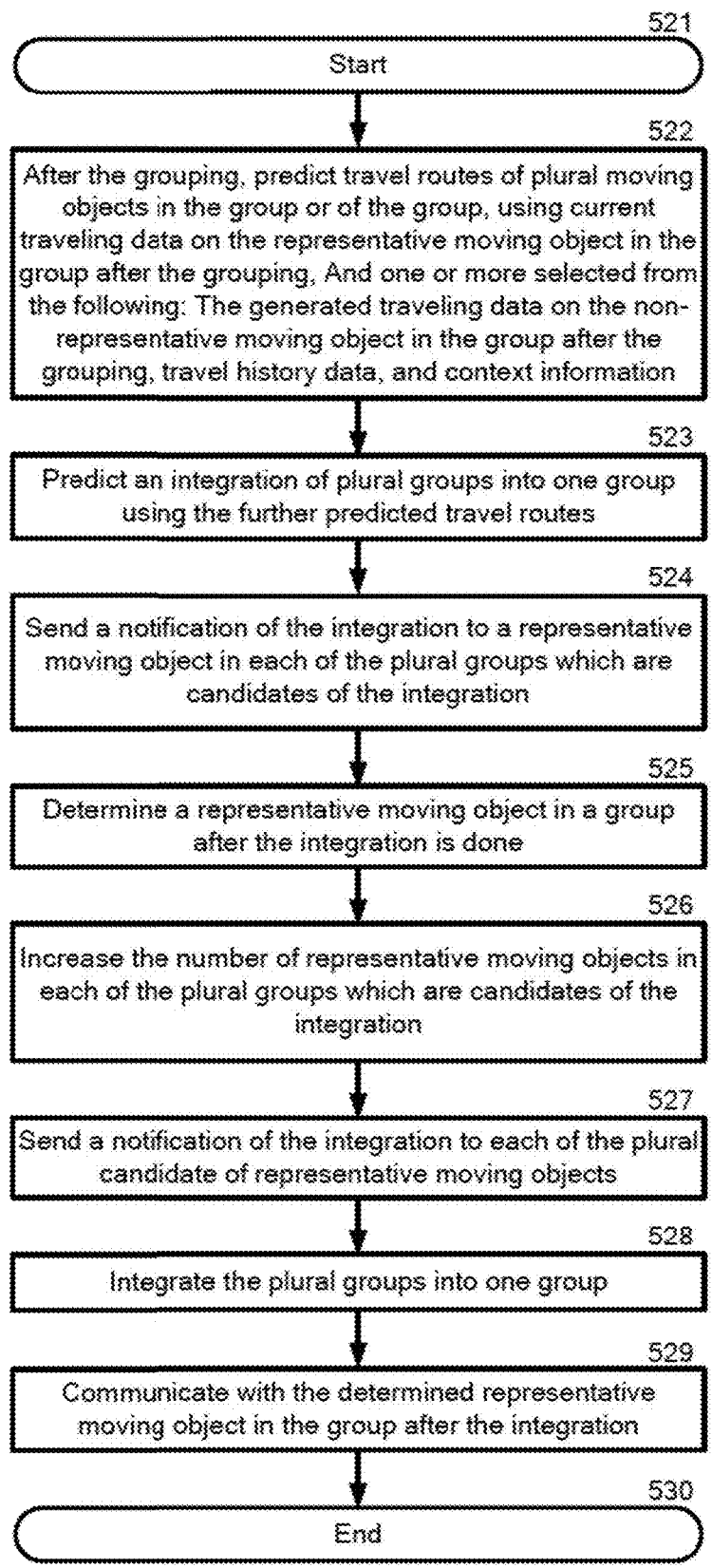

With reference now to FIG. 5C, FIG. 5C illustrates a flowchart for a process of integrating plural groups into one group and determining a representative moving object in the integrated group to communicate with the representative moving object in the integrated group.

At step 521, after the aforesaid grouping described in FIG. 5A or a splitting of one group into plural groups which is described in FIG. 5D mentioned below, the server starts the aforesaid process. The server continues to receive current traveling data transmitted from the representative moving object in each group and repeats steps 503 to 508 described in FIG. 5A.

At step 522, the server further predicts travel routes of plural moving objects in the group or of the group, using current traveling data on the representative moving object in the group after the grouping, and one or more selected from the following: the generated traveling data on the non-representative moving object in the group after the grouping, travel history data obtained from the storage (591), and the aforesaid context information.

This prediction may be done by, for example, identifying moving objects which are predicted to travel on a common or similar route using the aforesaid current traveling data, such as driving location, driving direction, or a combination thereof and road map information.

At step 523, the server predicts an integration of plural groups into one group using the further predicted travel routes. The prediction may be done by, for example, considering predicted travel routes of plural moving objects and, if necessary, the aforesaid travel history data.

At step 524, in response to the prediction of the integration, the server may send a notification of the integration to a representative moving object in each of the plural groups which are candidates of the integration. The notification may include, for example, information on IDs of groups which are to be integrated into one group or information on IDs of moving objects which are to be integrated into one group. The information may enable each moving object in the groups to be integrated to know that the group to which the moving object belongs to will be integrated into another or other groups.

At step 525, in response to the prediction of the integration, the server determines a representative moving object in a group after the integration is done. The determination may be done by, for example, identifying, among the moving objects belonging to the groups to be integrated, a vehicle which can act as a host vehicle. The server may determine plural representative moving objects.

Steps 525 and 524 can be simultaneously carried out or can be carried out in the order of step 525 and then step 524.

At step 526, the server may increase the number of representative moving objects in each of the plural groups which are candidates of the integration. This increase aims to grasp a more detailed state about moving objects in each of the plural groups and to safely carry out the integration.

At step 527, the server may send a notification of the integration to each of the plural representative moving objects which are candidates of the integration. This notification aims to let each moving object know the integration.

At step 528, the server integrates the plural groups into one group.

At step 529, the server communicates with the determined representative moving object in the group after the integration without communicating with another or other moving objects other than the representative moving object in a group (i.e. "non-representative moving objects"). After the integration, the server may send a notification of the integration to the determined representative moving object in the group after the integration.

Therefore, in one embodiment, the server may receive current traveling data only from the representative moving object in the group after the integration. Further, the server may obtain information on the non-representative moving objects through the representative moving object in the group after the integration.

In another embodiment, the server may transmit information only to the representative moving object in the group after the integration. After the representative moving object receives the information from the server, the representative moving object may transmit the received information to the non-representative moving objects, using V2V, in order to share the information in the group after the integration.

Accordingly, total communication volume between the group after the integration and the server can be reduced using the communication between the representative moving object and the server. The server may or share the group information in the group after the integration through the representative moving object.

At step 530, the server terminates the aforesaid process.

Figure 5D:
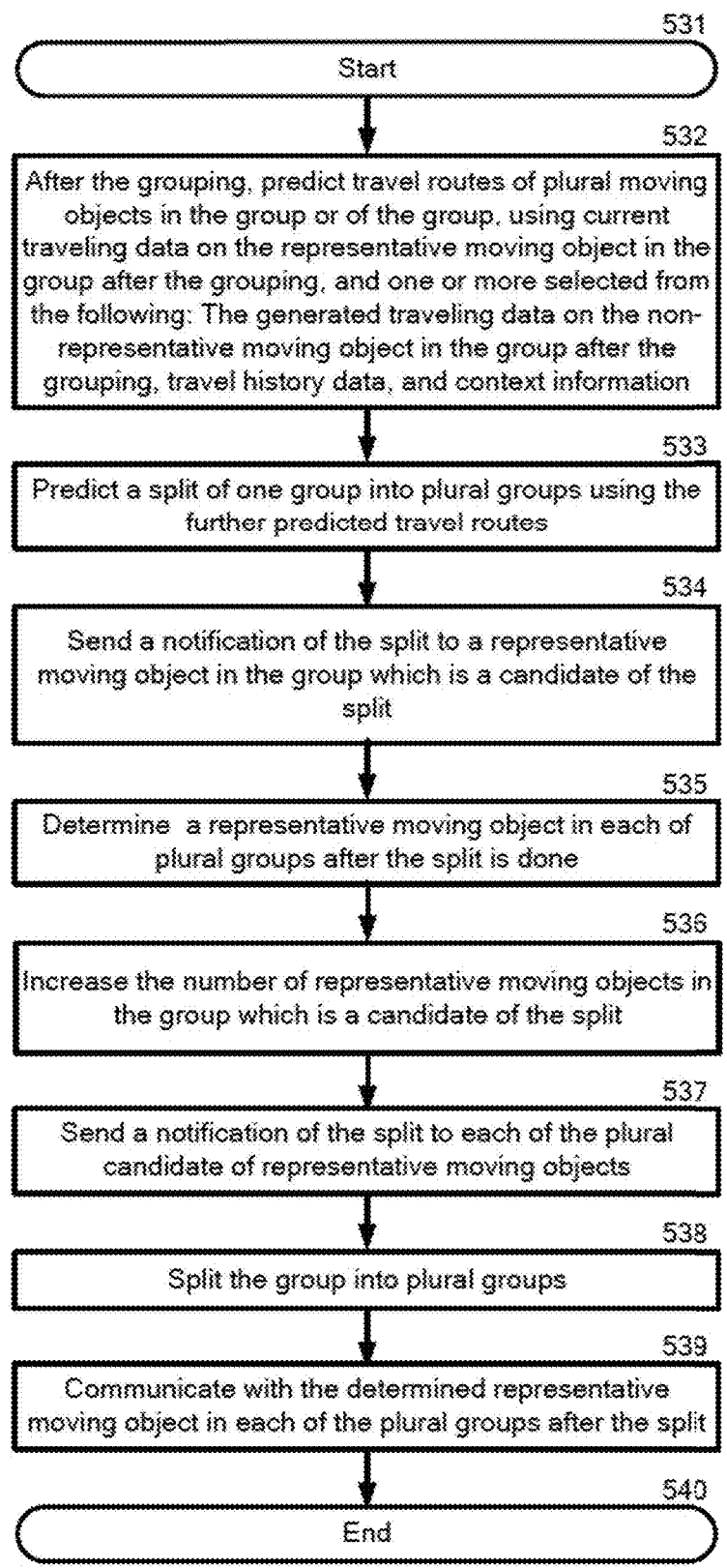

With reference now to FIG. 5D, FIG. 5D illustrates a flowchart for a process of splitting a group into plural groups and determining a representative moving object in each of the split groups to communicate with the representative moving object in each of the split groups.

At step 531, after the aforesaid grouping described in FIG. 5A or the aforesaid integration of plural groups into one group which is described in FIG. 5C, the server starts the aforesaid process. The server continues to receive current traveling data transmitted from the representative moving object in each group and repeats steps 503 to 508 described in FIG. 5A.

At step 532, the server further predicts travel routes of plural moving objects in the group or of the group, using current traveling data on the representative moving object in the group after the grouping, and one or more selected from the following: the generated traveling data on the non-representative moving object in the group after the grouping, travel history data obtained from the storage (591), and the aforesaid context information.

This prediction may be done by, for example, identifying moving objects which are predicted to travel on a common or similar route using the aforesaid current traveling data, such as driving location, driving direction, or a combination thereof and road map information.

At step 533, the server predicts a split of one group into plural groups using the further predicted travel routes. The prediction may be done by, for example, considering predicted travel routes of plural moving objects and, if necessary, the aforesaid travel history data.

At step 534, in response to the prediction of the split, the server may send a notification of the split to a representative moving object in the group which is a candidate of the split. The notification may include, for example, information on an ID of group which is to be split into plural groups or information on IDs of moving objects which are to be split into plural groups. The information enables each moving object in the group to be split to know that the group to which the moving object belongs to will be split into plural groups.

At step 535, in response to the prediction of the split, the server determines the representative moving object in each of plural groups after the split is done. The determination may be done by, for example, identifying, among the moving objects belonging to the group to be split, a vehicle which can act as a host vehicle. The server may determine plural representative moving objects.

Steps 535 and 534 can be simultaneously carried out or can be carried out in the order of step 535 and then step 534.

At step 536, in response to the prediction of the split, the server may increase the number of representative moving objects in the group which is a candidate of the split. This increase aims to grasp a more detailed state about moving objects in the group and safely carry out the integration.

At step 537, the server may send a notification of the split to each of the plural representative moving objects which is a candidate of the split. This notification aims to let each moving object know the split.

At step 538, the server splits the group into plural groups.

At step 539, the server communicates with the determined representative moving object in each of the plural groups after the split without communicating with another or other moving objects other than the representative moving object in a group (i.e. "non-representative moving objects"). After the split, the server may send a notification of the split to each of the determined representative moving objects in each of plural groups after the split.

Therefore, in one embodiment, the server may receive current traveling data only from the representative moving object in each group after the split. Further, the server may obtain information on the non-representative moving objects through the representative moving object in each group after the split.

In another embodiment, the server may transmit information only to the representative moving object in each group after the split. After the representative moving object receives the information from the server, the representative moving object may transmit the received information to the non-representative moving objects, using V2V, in order to share the information in the group after the split.

Accordingly, total communication volume between the group after the split and the server can be reduced using the communication between each representative moving object and the server. The server may or share the group information in the group after the split through the representative moving object.

At step 540, the server terminates the aforesaid process.

The integration described in FIG. 5C and the split described in FIG. 5D can be simultaneously carried out between or among groups. An example of the simultaneous integration and split is already mentioned in FIG. 4C mentioned above.

Figure 6:
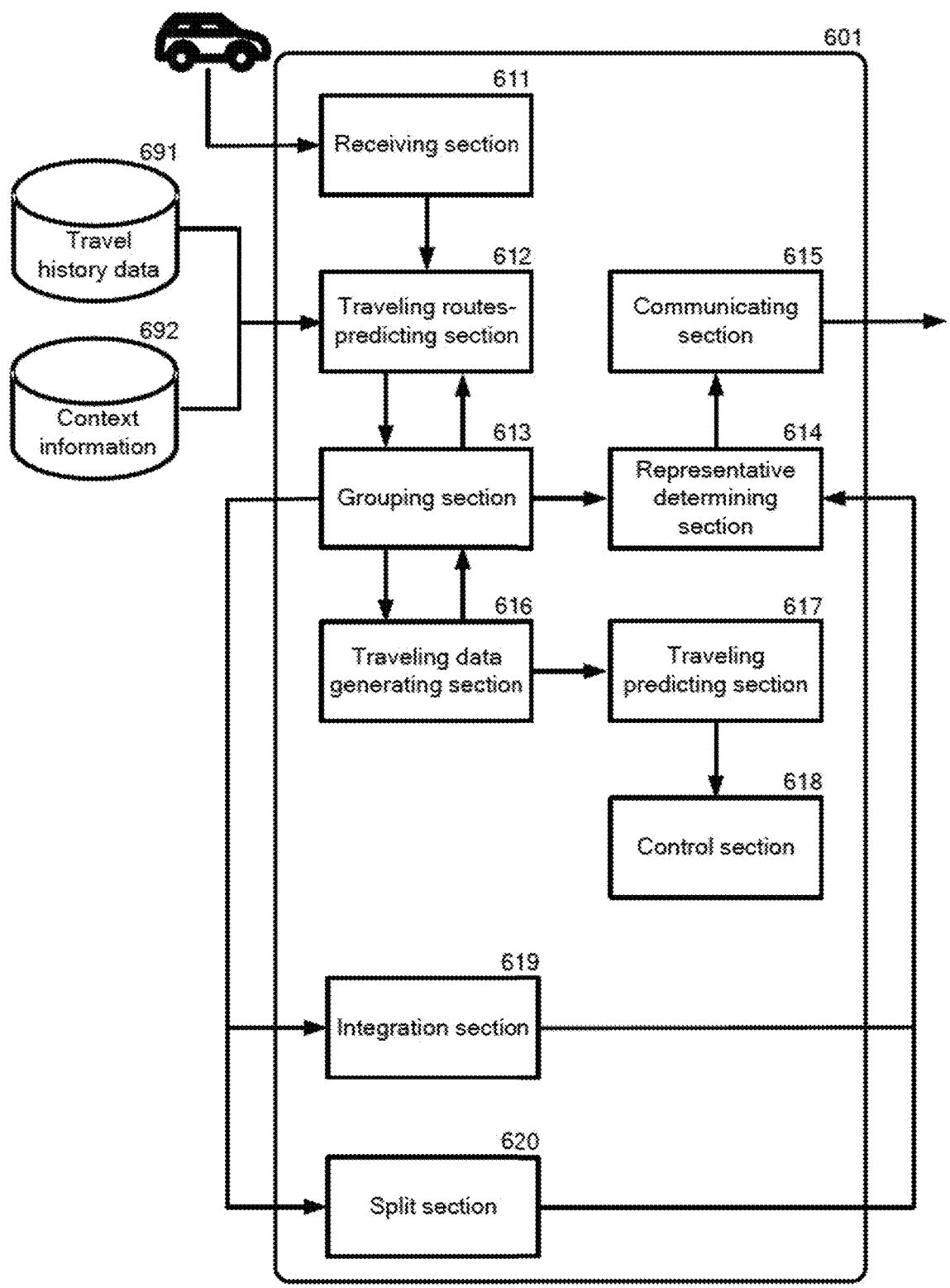
FIG. 6 is an overall functional block diagram of depicting a server computer hardware in relation to the process of FIGS. 5A to 5D, in accordance with an embodiment of the present invention.

FIG. 6 is an overall functional block diagram of depicting a server hardware in relation to the process of FIGS. 5A to 5D, in accordance with an embodiment of the present invention.

The computer system (601) may correspond to the computer system (101) described in FIG. 1A.

The computer system (601) may include a receiving section (611), a traveling routes-predicting section (612), a grouping section (613), a representative determining section (614) and a communicating section (615). The computer system (601) may further optionally include one or more of the following section: a traveling data generating section (616), a traveling predicting section (617), a control section (618), an integration section (619) and a split section (620).

The receiving section (611) receives current traveling data transmitted from moving objects, for example, each of vehicles. The receiving section (611) receives current traveling data transmitted from one or more representative moving objects after the grouping.

The receiving section (611) obtains travel history data on the moving objects from which the current traveling data is now transmitted.

The receiving section (611) may perform step 502 described in FIG. 5A.

The traveling routes-predicting section (612) predicts travel routes of plural moving objects, using current traveling data and travel history data (691). The traveling routes-predicting section (612) may obtain traveling history data from a storage for storing travel history data (691). The traveling routes-predicting section (612) may further obtain context information from a storage for storing context information (692).

The traveling routes-predicting section (612) may perform steps 502, 504 and 58 described in FIG. 5A; step 522 described in FIG. 5C; and step 532 described in FIG. 5D.

The grouping section (613) groups the plural moving objects into at least one group, using the predicted travel routes.

The grouping section (613) may perform step 505 described in FIG. 5A.

The representative determining section (614) determines a representative moving object in each group.

The representative determining section (614) may determine a representative moving object in a group after the integration is done in response to the prediction of the integration. The representative determining section (614) may further increase the number of representative moving objects in each of the plural groups which are candidates of the integration in response to the prediction of the integration.

The representative determining section (614) may determine a representative moving object in each of plural groups after the split is done in response to the prediction of the split. The representative determining section (614) may further increase the number of representative moving objects in the group which is a candidate of the split in response to the prediction of the split.

The representative determining section (614) may perform step 506 described in FIG. 5A; steps 525 and 526 described in FIG. 5C; and steps 535 and 536 described in FIG. 5D.

The communicating section (615) communicates with the representative moving object.

The communicating section (615) may send a notification of the integration to a representative moving object in each of the plural groups which are candidates of the integration in response to the prediction of the integration. The communicating section (615) may send a notification of the integration to each of the plural representative moving objects after the increase. The communicating section (615) may communicate with the determined representative moving object in the group after the integration.

The communicating section (615) may send a notification of the split to a representative moving object in the group which is a candidate of the split in response to the prediction of the split. The communicating section (615) may send a notification of the split to each of the plural representative moving objects after the increase. The communicating section (615) may communicate with the determined representative moving object in each of the plural groups after the split.

The communicating section (615) may perform step 508 described in FIG. 5A; steps 524, 527 and 529 described in FIG. 5C; and steps 534, 537 and 539 described in FIG. 5D.

The traveling data generating section (616) generates traveling data on a moving object other than the representative moving object in a group (i.e., "a non-representative moving object") while referring to current traveling data on the representative moving object.

The traveling data generating section (616) may perform step 512 described in FIG. 5B.

The traveling predicting section (617) predicts traveling of the group using the current traveling data on the representative moving object, the generated traveling data on the non-representative moving object and context information obtained from the storage (692).

The traveling predicting section (617) may perform step 513 described in FIG. 5B.

The control section (618) carries out a traffic control, a detection of traffic congestion, measures to relieve traffic congestion and/or an automatic driving, using the predicted traveling.

The control section (618) may perform step 514 described in FIG. 5B.

The integration section (619) predicts an integration of plural groups into one group using the further predicted travel routes and then integrates the plural groups into one group.

The integration section (619) may perform steps 523 and 528 described in FIG. 5C.

The split section (620) predicts a split of one group into plural groups using the further predicted travel routes and then splits the group into plural groups.

The split section (620) may perform steps 533 and 538 described in FIG. 5D.

The present invention may be a method, a system, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising:
grouping a plurality of moving objects into at least one group, using predicted travel routes of each moving object of the grouped plurality of moving objects;
determining, by a server, a representative moving object in each of the grouped plurality of moving objects, wherein the determined representative moving object in each of the grouped plurality of moving objects is selected to represent the grouped plurality of moving objects and communicate with the server on behalf of the grouped plurality of moving objects;

communicating, by the server, with the determined representative moving object, to receive a plurality of current traveling data from the determined representative moving object;

predicting a traveling route of the grouped plurality of moving objects using the plurality of current traveling data received from the determined representative moving object, a plurality of generated traveling data on a non-representative moving object in the grouped plurality of moving objects, a travel history data, and a plurality of context information; and controlling traffic for the predicted traveling route by enabling detection of traffic congestion, a plurality of measures to relieve traffic congestion, and an automatic driving.

2. The method of claim 1, wherein the plurality of generated traveling data on the non-representative moving object further comprises comprising:

calculating the plurality of generated traveling data on the non-representative moving object based on referring to the plurality of current traveling data received from the determined representative moving object, wherein the non-representative moving object is not in communication with the server.

3. The method of claim 2, wherein calculating the plurality of generated traveling data on the non-representative moving object further comprises:

presuming a length of a sequence of the grouped plurality of moving objects while referring to the presumed length, wherein a length of a sequence of the plurality of non-representative moving objects is determined by using model information on each of the non-representative moving objects.

4. The method of claim 1, wherein the plurality of context information is selected from the group consisting of: a plurality of route search information, a plurality of road attributes information, a plurality of driving characteristics information, a plurality of weather information, and a plurality of traffic information.

5. The method of claim 1, the method further comprising:

predicting a further traveling route of the grouped plurality of moving objects using the plurality of current traveling data from the determined representative moving object, the plurality of generated traveling data on the non-representative moving object, a plurality of travel history data, and the plurality of context information; and predicting an integration of a plurality of the grouped plurality of moving objects into one group using the predicted further traveling route.

6. The method of claim 5, the method further comprising:

in response to the predicted integration, sending a notification of the predicted integration to the determined representative moving object in each of the grouped plurality of moving objects which are candidates of the predicted integration.

7. The method of claim 5, the method further comprising:

in response to the predicted integration, determining a representative moving object for a group including the plurality of the grouped plurality of moving objects after the integration is completed.

8. The method of claim 7, the method further comprising:

integrating the grouped plurality of moving objects into one group; and communicating with the determined representative moving object in the one group after the integration.

9. The method of claim 5, the method further comprising:

in response to the predicted integration, increasing a number of the determined representative moving objects in each of the plurality of the grouped plurality of moving objects groups which are candidates of the integration.

10. The method of claim 9, the method further comprising:

in response to increasing the number of the determined representative moving objects, sending a notification of the predicted integration to each of the a plurality of determined representative moving objects.

11. The method of claim 1, the method further comprising:

predicting a further traveling route of the grouped plurality of moving objects, using the plurality of current traveling data from the determined representative moving object, the plurality of generated traveling data on the non-representative moving object, the travel history data, and the plurality of context information; and predicting a split of the grouped plurality of moving objects using the predicted further traveling route.

12. The method of claim 11, the method further comprising:

in response to the predicted split, sending a notification of the predicted split to the determined representative moving object in the grouped plurality of moving objects which is a candidate of the predicted split.

13. The method of claim 12, the method further comprising:

in response to the predicted split, determining a representative moving object in each of a plurality of the grouped plurality of moving objects after the predicted split is completed.

14. The method of claim 11, the method further comprising:

in response to the predicted split, increasing a number of the determined representative moving objects in the the grouped plurality of moving objects which is a candidate of the predicted split.

15. The method of claim 14, the method further comprising:

in response to increasing the number of the determined representative moving objects, sending a notification of the predicted split to each of a plurality of determined representative moving objects.

16. The method of claim 15, the method further comprising:

splitting the grouped plurality of moving objects into a plurality of groups; and communicating with the determined representative moving object in each of the plurality of groups after the split.

17. A computer system for grouping a plurality of moving objects capable of communicating with a server, comprising:

one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method, comprising:

grouping a plurality of moving objects into at least one group, using predicted travel routes of each moving object of the grouped plurality of moving objects;

determining, the server, a representative moving object in each of the grouped plurality of moving objects, wherein the determined representative moving object in each of the grouped plurality of moving objects is selected to represent the grouped plurality of moving objects and communicate with the server on behalf of the grouped plurality of moving objects; and communicating, by the server, with the determined representative moving object, to receive a plurality of current traveling data from the determined representative moving object;

predicting a traveling route of the grouped plurality of moving objects using the plurality of current traveling data received from the determined representative moving object, a plurality of generated traveling data on a non-representative moving object in the grouped plurality of moving objects, a travel history data, and a plurality of context information; and controlling traffic for the predicted traveling route by enabling detection of traffic congestion, a plurality of measures to relieve traffic congestion, and an automatic driving.

18. The computer system of claim 17, wherein the plurality of context information is selected from the group consisting of: a plurality of route search information, a plurality of road attributes information, a plurality of driving characteristics information, a plurality of weather information, and a plurality of traffic information.

19. A computer program product for grouping a plurality of moving objects capable of communicating with a server, the computer program product comprising a non-transitory computer readable storage medium having program instructions embodied therewith, the program instructions executable by the server to cause the server to perform a method comprising:

grouping the plurality of moving objects into at least one group, using predicted travel routes of each moving object of the grouped plurality of moving objects;

determining, by the server, a representative moving object in each of the grouped plurality of moving objects, wherein the determined representative moving object in each of the grouped plurality of moving objects is selected to represent the grouped plurality of moving objects and communicate with the server on behalf of the grouped plurality of moving objects; and communicating, by the server, with the determined representative moving object, to receive a plurality of current traveling data from the determined representative moving object;

predicting a traveling route of the grouped plurality of moving objects using the plurality of current traveling data received from the determined representative moving object, a plurality of generated traveling data on a non-representative moving object in the grouped plurality of moving objects, a travel history data, and a plurality of context information; and controlling traffic for the predicted traveling route by enabling detection of traffic congestion, a plurality of measures to relieve traffic congestion, and an automatic driving.

20. The computer program product of claim 19, wherein the plurality of generated traveling data on the non-representative moving object further comprises:

calculating the plurality of generated traveling data on the non-representative moving object based on referring to the plurality of current traveling data received from the determined representative moving object, wherein the non-representative moving object is not in communication with the server.

* * * * *